United States Patent
Navratil et al.

(10) Patent No.: US 7,496,509 B2
(45) Date of Patent: Feb. 24, 2009

(54) METHODS AND APPARATUS FOR STATISTICAL BIOMETRIC MODEL MIGRATION

(75) Inventors: Jiri Navratil, White Plains, NY (US); Ganesh N. Ramaswamy, Ossining, NY (US); Ran D. Zilca, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 954 days.

(21) Appl. No.: 10/857,029

(22) Filed: May 28, 2004

(65) Prior Publication Data

US 2005/0267752 A1    Dec. 1, 2005

(51) Int. Cl.
*G10L 15/00* (2006.01)
*G10L 15/06* (2006.01)

(52) U.S. Cl. .............. 704/243; 704/256.2; 704/244
(58) Field of Classification Search ........... 704/243, 704/244, 256.2
See application file for complete search history.

(56) References Cited

U.S. PATENT DOCUMENTS

| | | | |
|---|---|---|---|
| 5,185,848 A * | 2/1993 | Aritsuka et al. | 704/202 |
| 5,793,891 A * | 8/1998 | Takahashi et al. | 382/228 |
| 5,893,059 A * | 4/1999 | Raman | 704/256.2 |
| 6,151,575 A * | 11/2000 | Newman et al. | 704/260 |
| 6,167,377 A * | 12/2000 | Gillick et al. | 704/240 |
| 6,343,267 B1 * | 1/2002 | Kuhn et al. | 704/222 |
| 6,529,871 B1 | 3/2003 | Kanevsky et al. | |
| 7,072,834 B2 * | 7/2006 | Zhou | 704/244 |
| 2004/0122672 A1 * | 6/2004 | Bonastre et al. | 704/256 |

OTHER PUBLICATIONS

"NIST—Speaker Recognition Evaluations" retrieved Jan. 9, 2006 from http://www.nist.gov/speech/tests/spk/index.htm.
S.H. Maes, J. Navratil, U.V. Chaudhari, "Conversational speech biometrics", chapter in "Advances in E-commerce Agents: Broking, Negotiation, Security, and Mobility," Lecture Notes in Artificial Intelligence, Springer 2000.
U.V. Chaudhari, J. Navratil, G.N. Ramaswamy, R.D. Zilca "Future speaker recognition systems: Challenges and solutions," Proc. of AUTOID-2002, Tarrytown, NY, Mar. 2002.
G. Ramaswamy, J. Navratil, U. Chaudhari, and R. Zilca, "The IBM system for the NIST 2002 cellular speaker verification evaluation," in Proc. of the International Conference on Acoustics, Speech, and Signal Processing (ICASSP), (Hong Kong), IEEE, Apr. 2003.
U.V. Chaudhari, J. Navr'atil, and S.H. Maes. Multigrained modeling with pattern-specific maximum likelihood transformations for text-independent speaker recognition. IEEE Trans. Speech and Audio Processing, 2002.

(Continued)

*Primary Examiner*—Patrick N Edouard
*Assistant Examiner*—Eric Yen
(74) *Attorney, Agent, or Firm*—Ference & Associates LLC

(57) ABSTRACT

In large-scale deployments of speaker recognition systems the potential for legacy problems increases as the evolving technology may require configuration changes in the system thus invalidating already existing user voice accounts. Unless the entire database of original speech waveform were stored, users need to reenroll to keep their accounts functional, which, however, may be expensive and commercially not acceptable. Model migration is defined as a conversion of obsolete models to new-configuration models without additional data and waveform requirements. The present disclosure investigates ways to achieve such a migration with minimum loss of system accuracy.

11 Claims, 2 Drawing Sheets

A — FEATURE SPACE MAPPING STEP
B — MODEL COMPONENT MAPPING STEP
C — WAVEFORM SYNTHESIS

OTHER PUBLICATIONS

D. Reynolds, T. Quatieri, and R. Dunn. Speaker verification using adapted Gaussian mixture models. Digital Signal Processing, 10(1-3):19-41, 2000.

R.O. Duda et al., "Pattern Classification," John Wiley & Sons, 2nd Ed., pp. 282-284, 2001.

D. Chazan, G. Cohen, R. Hoory, M. Zibulski, "Speech reconstruction from mel-frequency cepstral co-efficients and pitch frequency," in Proc. Of the International Conference on Acoustics, Speech and Signal processing (ICASSP), Jun. 2000.

J. Navratil, Ganesh Ramaswamy, Ran Zilca, "Statistical Model Migration in Speaker Recognition", IBM T.J. Watson Research Center.

* cited by examiner

METHODS AND APPARATUS FOR STATISTICAL BIOMETRIC MODEL MIGRATION

FIELD OF THE INVENTION

The present invention relates generally to the transformation of target models in biometric applications when biometrics system components are updated or revised.

BACKGROUND OF THE INVENTION

A variety of real-world challenges arise in today's voice authentication technology accompanied by an increasing business demand for security in telephone applications. While most of the current challenges are directly or indirectly related to accuracy, robustness and computational efficiency, future field deployments with an ever growing number of biometric (in particular voice-enabled) user accounts will bring new sets of practical issues with them. The dynamically evolving area of biometric authentication, particularly speaker recognition, promises one such challenge: legacy issues in biometric (e.g. voiceprint, fingerprint, etc. model) maintenance. It is reasonable to expect that the average life span of a user account is likely to last longer than an innovation cycle of the underlying authentication technology. In other words, for a voice-enabled (or other biometric) account including the user's model representation, the particular implemented algorithm that created the model may change one or several times during the overall period of using the account.

Because the parametric structure of the user models is dictated by the underlying algorithms used to produce them, significant legacy issues (i.e., incompatibilities) can be introduced into existing large-scale databases of users. Consequently, algorithmic changes rendering existing accounts obsolete put in front of infrastructure providers new problems and decisions. For instance, assume that a service provider maintains several hundreds of thousands of voice-enabled accounts including users voiceprint models in their database. These models have a close relationship to data and algorithmic components inherent to the system. With a new generation of updated (improved) components, the provider is faced with the question of how to keep the existing accounts usable (i.e., voice-enabled). Among the few possibilities for addressing this problem are: 1) have users actively re-enroll into the new system, 2) automatically re-enroll users from a stored original waveform, 3) keep multiple system versions on line to support obsolete as well as new accounts, or 4) automatically convert obsolete models to the new configuration. Obviously, each solution builds on different assumptions (e.g. on the existence of an original waveform in case of voiceprints), has different consequences (e.g. increased complexity due to multiple system versions), and degrees of practicability (e.g. having users call to re-enroll, which may be unacceptable).

In view of the foregoing, a need has been recognized in connection with maintaining the functionality of users' accounts in the face of ever-changing components.

SUMMARY OF THE INVENTION

In accordance with at least one presently preferred embodiment of the present invention, the solution no. (4) mentioned above, automatically converting an obsolete user model (based on a legacy system configuration) to a new model (compatible with the updated system) is addressed, while ensuring a minimum compromise in accuracy. Herein, this process is referred to as "model migration" and builds on the assumption that the obsolete model represents the only information available for the account (e.g., that no original waveform exists in case of voice authentication).

The primary quality criterion for any model migration technique is its performance in preserving system accuracy. The degree to which individual techniques will perform largely depends on the type of mismatch between the obsolete and the new technology, the background (system) data mismatch, as well as configuration mismatch. While it is desirable to have seamless migration independent of the modeling and features used, it is reasonable to focus first on the more common scenario involving a conversion between two GMM models of different size sharing common feature space. Generally, there is addressed herein the case of mismatched sizes between GMM models that are universal background models with differing data composition; these structures are referred to as substrates. It should thus be recognized that with a change in substrate, every user model (now obsolete) essentially needs to be migrated to a new substrate.

In summary, one aspect of the invention provides an apparatus for updating a biometric authentication arrangement, the apparatus comprising: an arrangement for accepting obsolete target models associated with at least one obsolete biometric authentication system substrate; an arrangement for transforming the obsolete target models into updated target models associated with at least one new or revised biometric authentication system substrate; the transforming arrangement being adapted to transform the obsolete target models into updated target models either: without the inclusion of additional data or additional waveform requirements; or with the inclusion of limited auxiliary data or limited auxiliary waveform requirements.

Another aspect of the invention provides a method for updating a biometric authentication arrangement, the method comprising the steps of: accepting obsolete target models associated with at least one obsolete biometric authentication system substrate; transforming the obsolete target models into updated target models associated with at least one new or revised biometric authentication system substrate; the transforming step comprising transforming the obsolete target models into updated target models either: without the inclusion of additional data or additional waveform requirements; or with the inclusion of limited auxiliary data or limited auxiliary waveform requirements.

Furthermore, an additional aspect of the invention provides a program storage device readable by machine, tangibly embodying a program of instructions executable by the machine to perform method steps for updating a biometric authentication arrangement, the method comprising the steps of: accepting obsolete target models associated with at least one obsolete biometric authentication system substrate; transforming the obsolete target models into updated target models associated with at least one new or revised biometric authentication system substrate; the transforming step comprising transforming the obsolete target models into updated target models either: without the inclusion of additional data or additional waveform requirements; or with the inclusion of limited auxiliary data or limited auxiliary waveform requirements.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Herebelow, numerals in brackets—[ ]—are keyed to the list of references found at the end of this section.

As an example, addressed herein is the task of speaker verification and user models having a GMM structure with mean parameters adapted via the Maximum A—Posteriori (MAP) method from a Universal Background Model (UBM) [4]. There is broadly contemplated herein a statistical method to migrate the user mean parameters from an obsolete model, $M_0$ that were adapted from an obsolete substrate, $W_0$, of size $N_0$ Gaussians to a new user model M, consistent with a new substrate, $W_1$, of size $N_1$. It is assumed that both substrate UBMs are trained in a feature space identical up to a linear transform, but were composed from different data sets, and, in general, $N_0 \neq N_1$. Possibilities of overcoming the feature space assumption are outlined herebelow.

Figure 1:
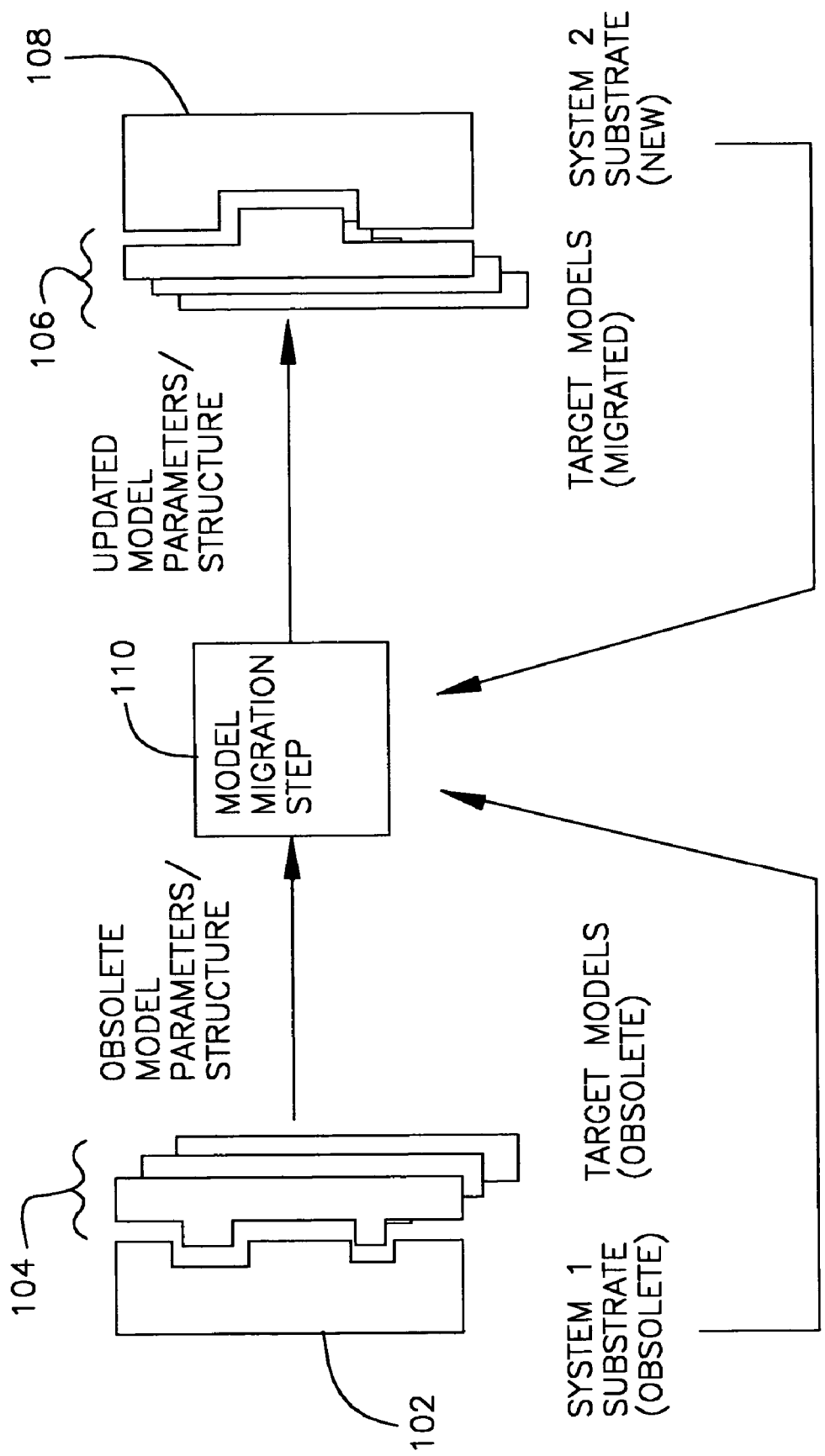
FIG. 1 schematically illustrates the basics of a migration method in accordance with at least one preferred embodiment of the present invention.
Figure 2:
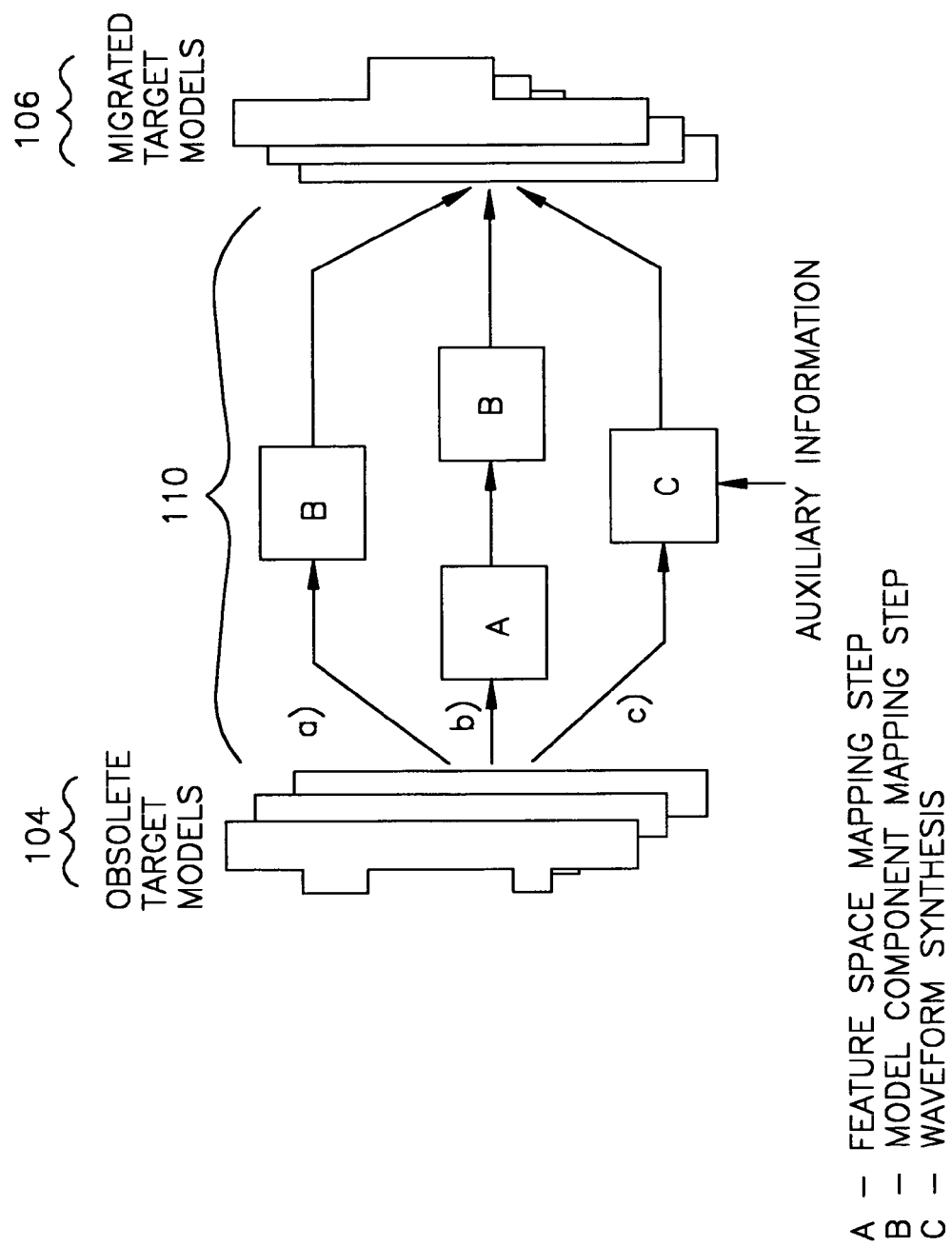
FIG. 2 schematically illustrates some specifics of a model migration step from the method of FIG. 1.

FIGS. 1 and 2 schematically illustrate the basics of a migration method in accordance with at least one preferred embodiment of the present invention. As shown in FIG. 1, an obsolete system substrate 102 is configured to accommodate obsolete target models 104. These obsolete models 104 will thus likely be incompatible with a new/revised system substrate 108. Accordingly, in order to transform the obsolete models 104 into updated (or migrated) target models 106, a model migration step 110 is preferably employed. An algorithm forming part of such a step 110 is discussed in detail herebelow.

FIG. 2 illustrates some specifics of a model migration step 110 in accordance with an embodiment of the present invention. As shown, any of three variant streams may be preferably employed in this step. In a first stream (a), there is solely a model component mapping step (B). In a second stream (b), there is a feature space mapping step (A) followed by a model component mapping step (B). Finally, in a third stream (c), there is a waveform synthesis step (C) that makes use of auxiliary information from both the obsolete target models 104 and the migrated target models 106. These different streams will also be better appreciated from the discussion herebelow.

The following one-iteration algorithm (in numbered steps 1-4) can preferably implement, as part of step 110, the MAP principle based on the means of the obsolete model and given the parameters of the new substrate. It exemplifies the model components mapping step (B).

1. Reconstruct the obsolete sample means $\hat{\mu}_{0i}$ of the target speaker from the, adapted $M_0$ and $W_0$ for each Gaussian i. For the typical adaptation formula $$\mu_{0i} = \frac{n_i}{n_i + r}\hat{\mu}_{0i} + \frac{r}{n_i + r}m_{0i} \tag{[1]}$$

this can be easily achieved knowing the global relevance factor r, the vector softcount $n_i$ (which is assumed available along with the obsolete model), and using the obsolete UBM mean $m_{0i}$.

2. Calculate the set of posterior probabilities of Gaussian i of the new UBM accounting for the obsolete sample mean $\hat{\mu}_j$.

$$\gamma_{ij} = Pr(i \mid \hat{\mu}_{0j}) = \frac{\pi_{1i}\rho_{1i}(\hat{\mu}_{0j})}{\sum_{k=1}^{N_1}\pi_{1k}\rho_{1k}(\hat{\mu}_{0j})} \tag{1}$$

$$1 \leq i \leq N_1, 1 \leq j \leq N_0$$

where $\pi_{1i}$ denotes the prior probability and $P_{1i}(\bullet)$ the observation probability of Gaussian i of model $W_1$.

3. Calculate new sample mean estimates on the new substrate:

$$\hat{\mu}_{1i} = \sum_{k=1}^{N_0} n_k \gamma_{ik} \hat{\mu}_{0k} \Big/ \sum_{k=1}^{N_0} n_k \gamma_{ik} \tag{2}$$

$$1 \leq i \leq N_1,$$

Note that each component contribution is weighted by the original sample size $n_k$ attributed to each mixture component to reflect the natural proportionality of tile data. This is identical to multiplying by an obsolete prior probability $\pi_{0k}$ which, however, is typically not used in mean-only MAP adapted systems and is typically replaced by $\pi_{1k}$.

4. Compute new (migrated) mean parameters via adaptation:

$$\mu_{1i} = \alpha_i \hat{\mu}_{1i} + (1 - \alpha_i) m_{1i} \tag{3}$$

$$\alpha_i = \sum_{k=1}^{N_0} n_k \gamma_{ik} \Big/ \left( \sum_{k=1}^{N_0} n_k \gamma_{ik} + r \right)$$

$$1 < i < N, \tag{4}$$

The above algorithm can be interpreted as one providing a new MAP estimate based on the new substrate model $W_1$ of a feature vector sequence comprised of the individual obsolete mean vectors in their original proportional representation. Further elaborating this idea, the described migration is identical to using the original training vector sequence, however, without its original causal ordering, quantized into $N_0$ different codebook vectors via the obsolete substrate model $W_0$.

In the case of differences in feature spaces due to invertible linear transforms, such as the Maximum Likelihood Linear Transform (MLLT) [2], a straightforward transformation can be applied as follows $$\hat{\mu} = A_1(A_0)^{-1}\hat{\mu}' \tag{5}$$

with $\hat{\mu}'$ the mean in the space of $A_0$, and $A_1Al$ the transform into the space of $W_1$.

Note that in computing the posteriors in Step 2, only the obsolete mean parameters are used. An alternative approach to further include the obsolete covariances into the softcount computation utilizes the symmetric KL divergence of two Gaussians defined as $$D_{KL}(N_p \| N_q) = \quad (6)$$
$$\frac{1}{2}tr\left[\left(\sum_p - \sum_q\right)\left(\sum_q^{-1} - \sum_p^{-1}\right)\right] + \frac{1}{2}tr\left[\left(\sum_p^{-1} + \sum_q^{-1}\right)(\mu_p - \mu_q)(\mu_p - \mu_q)^T\right]$$

This measure becomes 0 if $\mu_p = \mu_q$ and $\Sigma_p = \Sigma_q$, as opposed to the quadratic term in the exponent of the Gaussian function, $$(\mu_p - \mu_q)^T \sum_p^{-1} (\mu_p - \mu_q)$$

which becomes 0 already with $\mu_p = \mu_q$. Utilizing the KL divergence can prevent overemphasizing particular Gaussian pairs in $\gamma_{ij}$ due to pure mean similarity. To obtain a proper scale one may preferably use (6) in an exponential form as follows:

$$\gamma_{ij} = \sqrt{\pi_{1i}\pi_{0j}}\exp(-D_{KL}(p_{1i}\|p_{0j}))/C_j \quad (7)$$

$$1 \leq i \leq N_1, 1 \leq j \leq N_0$$

with C the normalizing term to satisfy $\Sigma_i \gamma_{ij} = 1$. The above form of $\gamma$ is used in Step 2 in place of (2).

Other distance measures, such as the Bhattacharyya distance may be used in place of the KL divergence (6).

The functional block of Feature Mapping (A in FIG. 2) can be implemented using various standard mapping or projection methods. Beyond invertible linear transforms, which can be solved via eq. (6), a possible but not sole approach would involve a the use of neural networks [10] to map one feature space into another trained using a held-out set of data and applied on the feature space of the obsolete system.

The functional block of Waveform Synthesis (C in FIG. 2) can be implemented using various algorithms for synthesis of speech signal waveforms from spectral representations, such as from cepstral features [7]. The synthesized waveform can then be used to re-enroll the target into the new system. Furthermore, the functional block C may also include partial synthesis, e.g. a synthesis of sequences of feature vectors, rather than the full waveforms, by using the set of obsolete model (and substrate) parameters. For example, in case of GMMs described above, a feature vector sequence can be generated as independent, identically distributed stochastic process with the mean and variance identical to a particular subset of Gaussian components of the obsolete model and be fed into the new system (assuming identical feature space).

By way of conclusion, statistical model migration is a viable way of converting models, that were rendered obsolete by system configuration changes, to new models compatible with a new system. It should be understood that the migration techniques discussed and contemplated herein are applicable in a wide range of environments. Thus, while voice authentication in telephony might represent one meaningful environment in which the migration techniques may be employed, they can also be applicable to a wide range of other biometric modeling systems such as fingerprinting, face recognition, hand geometry recognition and iris or retina scans, among many others.

REFERENCES

[1] D. Reynolds, T. Quatieri, and R. Dunn, "Speaker verification using adapted gaussian mixture models," *Digital Signal Processing*, Vol. 10, pp. 19-41, January/April/July 2000.

[2] U. Chaudhari, J. Navratil, and S. Maes, "Multi-grained modeling with pattern-specific maximum likelihood transformations for text-independent speaker recognition,"*IEEE Trans. Speech and Audio Processing*, 2002.

[3] (URL) [http://www.]nist.gov/speech/tests/spk/index.htm.

[4] G. Ramaswamy, J. Navratil, U. Chaudhari, and R. Zilca, "The IBM system for the NIST 2002 cellular speaker verification evaluation," in *Proc. of the International Conference on Acoustics, Speech, and Signal Processing (ICASSP)*, (Hong Kong), IEEE, April 2003.

[5] S. Maes, J. Navratil, and U. Chaudhari, *E-Commerce, Agents, Marketplace—Solutions, Security Issues, and Supply Demand*, ch. Conversational Speech Biometrics. LNAI 2033, Springer Verlag, 2001.

[6] U. Chaudhari, J. Navratil, C. Ramaswamy, and R. Zilca, "Future speaker recognition systems: Challenges and solutions," in *Proc. Of AUTOID*-2002, (Tarrytown, N.Y.), March 2002.

[7] D. Chazan, G. Cohen, R. Hoory, and M. Zibulski, "Speech reconstruction from mel-frequency cepstral co-efficients and pitch frequency," in *Proc. Of the International Conference on Acoustics, Speech, and Signal Processing (ICASSP)*, June 2000.

[8] K. Fukunaga, "Statistical Pattern Recognition," Academic Press, $2^{nd}$ Ed., 1990, ISBN 0-12-269851-7

[9] U.S. Pat. No. 6,529,871

[10] R. O. Duda et al., "Pattern Classification," John Wiley & Sons, $2^{nd}$ Ed., 2001, ISBN 0-471-05669-3

It is to be understood that the present invention, in accordance with at least one presently preferred embodiment, includes an arrangement for accepting obsolete target models and an arrangement for transforming the obsolete target models into updated target models. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

APPENDIX

TABLE 1

DCF/EER results for migrated systems without T-Norm

| Original Size ($N_0$) | Target size (Number of Gaussians $N_1$) | | | |
|---|---|---|---|---|
| | 256 | 512 | 1024 | 2048 |
| 256 | 80.2/22.2 | 94.8/32.0 | 97.3/35.6 | 99.1/39.3 |
| 512 | 85.2/23.3 | 76.6/21.5 | 90.0/29.1 | 96.3/34.7 |
| 1024 | 79.6/20.5 | 81.2/22.8 | 64.9/18.7 | 87.7/29.7 |

TABLE 1-continued

DCF/EER results for migrated systems without T-Norm

| Original | Target size (Number of Gaussians $N_1$) | | | |
|---|---|---|---|---|
| Size ($N_0$) | 256 | 512 | 1024 | 2048 |
| 2048 | 70.3/17.4 | 73.1/18.8 | 68.4/19.7 | 64.7/20.2 |
| Ideal Bsl | 46.6/11.4 | 42.6/10.8 | 39.9/10.1 | 37.1/9.4 |

TABLE 2

DCF/EER results for migrated systems with T-Norm

| Original | Target size (Number of Gaussians $N_1$) | | | |
|---|---|---|---|---|
| Size ($N_0$) | 256 | 512 | 1024 | 2048 |
| 256 | 49.0/13.5 | 61.7/16.3 | 74.2/19.8 | 85.6/23.0 |
| 512 | 50.1/13.8 | 45.2/12.2 | 58.0/15.7 | 75.8/20.4 |
| 1024 | 48.1/13.3 | 47.4/13.0 | 41.0/11.1 | 63.0/16.6 |
| 2048 | 46.4/12.3 | 46.1/12.4 | 44.6/12.0 | 47.2/12.4 |
| Ideal Bsl | 35.6/10.2 | 33.5/9.3 | 32.4/8.8 | 31.9/8.4 |

TABLE 3

DCF/EER results for migration based on probabilities versus the KL divergence

| Migration | 512 → 256 | 2048 → 256 |
|---|---|---|
| Prob. (plain) | 85.2/23.3 | 70.3/17.4 |
| KL (plain) | 62.8/16.8 | 60.5/15.6 |
| Prob. (T-Norm) | 50.1/13.8 | 46.4/12.3 |
| KL (T-Norm) | 56.4/16.0 | 52.2/14.0 |

What is claimed is:

1. An apparatus for updating a biometric authentication arrangement, said apparatus comprising:

an arrangement for accepting obsolete target models associated with at least one obsolete biometric authentication system substrate; and an arrangement for transforming the obsolete target models into updated target models associated with at least one new or revised biometric authentication system substrate;

said arrangement for transforming being adapted to transform the obsolete target models into the updated target models via a model component mapping step using at least one Gaussian mixture component and auxiliary data associated with the obsolete target models, wherein the model component mapping step involves providing a new Maximum A-Posteriori estimate based on means, covariances, and other statistical parameters associated with the obsolete target models and in the context of parameters associated with the at least one new or revisited biometric authentication system substrate;

wherein the biometric authentication arrangement involves at least one of: voice authentication; fingerprinting; face recognition; hand geometry; iris scanning and retina scanning; and wherein the component mapping step further comprises:

(1) reconstructing obsolete sample means ($\hat{\mu}_{0i}$) of a target speaker from an obsolete model and an obsolete substrate using an adaptation formula comprising $$\hat{\mu}_{0i} = \frac{n_i}{n_i + r}\hat{\mu}_{0i} + \frac{r}{n_1 + r}m_{0i},$$

wherein i is the Gaussian mixture component, r is a global relevance factor, $n_i$ is a vector softcount $n_i$ and $m_{0i}$ is an obsolete universal background model mean;

(2) calculating a set of posterior probabilities of Gaussian mixture component i for a new universal background model, accounting for an obsolete sample mean $\hat{\mu}_j$, using a second formula comprising $$\gamma_{ij} = Pr(i \mid \hat{\mu}_{0j})$$
$$= \frac{\pi_{1i} p_{1i}(\hat{\mu}_{0j})}{\sum_{k=1}^{N_1} \pi_{1k} p_{1k}(\hat{\mu}_{0j})},$$

where $1 \leq i \leq N_1$, $1 \leq j \leq N_0$, and wherein $\pi_{1i}$ denotes a prior probability and $p_{1i}(\cdot)$ denotes an observation probability of Gaussian mixture component i of the new universal background model;

(3) calculating new sample mean estimates on a new substrate using a third formula comprising $$\hat{\mu}_{1i} = \sum_{k=1}^{N_0} n_k \gamma_{ik} \hat{\mu}_{0k} \Big/ \sum_{k=1}^{N_0} n_k \gamma_{ik},$$

where $1 \leq i \leq N_1$, and wherein each Gaussian mixture component i is weighted by an original sample size $n_k$ attributed to each Gaussian mixture component i to reflect a natural proportionality of tile data; and (4) computing new mean parameters using another adaptation formula comprising:

$$\mu_{1i} = \alpha_i \hat{\mu}_{1i} + (1 - \alpha_i) m_{1i}$$
$$\alpha_i = \sum_{k=1}^{N_0} n_k \gamma_{ik} \Big/ \left(\sum_{k=1}^{N_0} n_k \gamma_{ik} + r\right),$$

where $1 < i < N$.

2. The apparatus according to claim 1, wherein said arrangement for transforming is adapted to transform the obsolete target models into updated target models via a feature space mapping step followed by the model component mapping step.

3. The apparatus according to claim 1, wherein the feature space mapping step involves using neural networks to map at least one feature space onto at least one other feature space.

4. The apparatus according to claim 1, wherein said arrangement for transforming is adapted to transform the obsolete target models into updated target models via a waveform synthesis step.

5. The apparatus according to claim 4, wherein the waveform synthesis step employs auxiliary information stored along with the obsolete target models prior to transformation.

6. A method for updating a biometric authentication arrangement, said method comprising the steps of:

accepting obsolete target models associated with at least one obsolete biometric authentication system substrate; and transforming the obsolete target models into updated target models associated with at least one new or revised biometric authentication system substrate;

said transforming further comprising transforming the obsolete target models into the dated target models via a model component mapping step using at least one Gaussian mixture component and auxiliary data associated with the obsolete target models, wherein the model component mapping step involves providing a new Maximum A-Posteriori estimate based on means, covariances, and other statistical parameters associated with the obsolete target models and in the context of parameters associated with the at least one new or revisited biometric authentication system substrate;

wherein the biometric authentication arrangement involves at least one of: voice authentication; fingerprinting; face recognition; hand geometry; iris scanning and retina scanning; and wherein the component mapping step further comprises:

(1) reconstructing obsolete sample means ($\hat{\mu}_{0i}$) of a target speaker from an obsolete model and an obsolete substrate using an adaptation formula comprising $$\mu_{0i} = \frac{n_i}{n_i + r}\hat{\mu}_{0i} + \frac{r}{n_1 + r}m_{0i},$$

wherein i is the Gaussian mixture component, r is a global relevance factor, $n_i$ is a vector softcount $n_i$ and $m_{0i}$ is an obsolete universal background model mean:

(2) calculating a set of posterior probabilities of Gaussian mixture component i for a new universal background model, accounting for an obsolete sample mean $\hat{\mu}_j$, using a second formula comprising $$\gamma_{ij} = Pr(i | \hat{\mu}_{0j})$$
$$= \frac{\pi_{1i} p_{1i}(\hat{\mu}_{0j})}{\sum \frac{N_1}{k=1} \pi_{1k} p_{1k}(\hat{\mu}_{0j})},$$

where $1 \leq i \leq N_1$, $1 \leq j \leq N_0$, and wherein $\pi_{1i}$ denotes a prior probability and $p_{1i}(\cdot)$ denotes an observation probability of Gaussian mixture component i of the new universal background model;

(3) calculating new sample mean estimates on a new substrate using a third formula comprising $$\hat{\mu}_{1i} = \sum_{k=1}^{N_0} n_k \gamma_{ik} \hat{\mu}_{0k} / \sum_{k=1}^{N_0} n_k \gamma_{ik},$$

where $1 \leq i \leq N_1$, and wherein each Gaussian mixture component is weighted by an original sample size $n_k$ attributed to each Gaussian mixture component to reflect a natural proportionality of tile data; and (4) computing new mean parameters using another adaptation formula comprising:

$$\mu_{1i} = \alpha_i \hat{\mu}_{1i} + (1 - \alpha_i) m_{1i}$$
$$\alpha_i = \sum_{k=1}^{N_0} n_k \gamma_{ik} / \left(\sum_{k=1}^{N_0} n_k \gamma_{ik} + r\right),$$

where $1 < i < N$.

7. The method according to claim 6, wherein said step of transforming the obsolete target models into updated target models associated with at least one new or revised biometric authentication system substrate comprises transforming the obsolete target models into updated target models via a feature space mapping step followed by the model component mapping step.

8. The method according to claim 7, wherein said feature space mapping step involves using neural networks to map at least one feature space onto at least one other feature space.

9. The method according to claim 6, wherein said step of transforming the obsolete target models into updated target models associated with at least one new or revised biometric authentication system substrate comprises transforming the obsolete target models into updated target models via a waveform synthesis step.

10. The method according to claim 9, wherein said waveform synthesis step employs auxiliary information stored along with the obsolete target models prior to transformation.

11. A program storage device readable by machine, tangibly embodying a program of instructions executable by the machine to perform method steps for updating a biometric authentication arrangement, said method comprising the steps of:

accepting obsolete target models associated with at least one obsolete biometric authentication system substrate; and transforming the obsolete target models into updated target models associated with at least one new or revised biometric authentication system substrate;

said transforming further comprising transforming the obsolete target models into the updated target models via a model component mapping step using at least one Gaussian mixture component and auxiliary data associated with the obsolete target models, wherein the model component mapping step involves providing a new Maximum A-Posteriori estimate based on means, covariances, and other statistical parameters associated with the obsolete target models and in the context of parameters associated with the at least one new or revisited biometric authentication system substrate;

wherein the biometric authentication arrangement involves at least one of: voice authentication; fingerprinting; face recognition; hand geometry; iris scanning and retina scanning; and wherein the component mapping step further comprises:

(1) reconstructing obsolete sample means ($\hat{\mu}_{0i}$) of a target speaker from an obsolete model and an obsolete substrate for each Gaussian mixture component i using an adaptation formula comprising $$\mu_{0i} = \frac{n_i}{n_i + r}\hat{\mu}_{0i} + \frac{r}{n_1 + r}m_{0i},$$

wherein i is the Gaussian mixture component, r is a global relevance factor, $n_i$ is a vector softcount $n_i$ and $m_{0i}$ is an obsolete universal background model mean;

(2) calculating a set of posterior probabilities of Gaussian mixture component i for a new universal background model, accounting for an obsolete sample mean $\hat{\mu}_j$ using a second formula comprising $$\gamma_{ij} = Pr(i \mid \hat{\mu}_{0j})$$
$$= \frac{\pi_{1i} p_{1i}(\hat{\mu}_{0j})}{\sum_j \frac{N_1}{k=1} \pi_{1k} p_{1k}(\hat{\mu}_{0j})},$$

where $1 \leq i \leq N_1$, $1 \leq j \leq N_0$, and wherein $\pi_{1i}$ denotes a prior probability and $p_{1i}(\cdot)$ denotes an observation probability of Gaussian mixture component i of the new universal background model;

(3) calculating new sample mean estimates on a new substrate using a third formula comprising $$\hat{\mu}_{1i} = \sum_{k=1}^{N_0} n_k \gamma_{ik} \hat{\mu}_{0k} \Big/ \sum_{k=1}^{N_0} n_k \gamma_{ik},$$

where $1 \leq i \leq N_1$, and wherein each Gaussian mixture component i is weighted by an original sample size $n_k$ attributed to each Gaussian mixture component i to reflect a natural proportionality of tile data: and (4) computing new mean parameters using another adaptation formula comprising:

$$\mu_{1i} = \alpha_i \hat{\mu}_{1i} + (1 - \alpha_i) m_{1i}$$
$$\alpha_i = \sum_{k=1}^{N_0} n_k \gamma_{ik} \Big/ \left( \sum_{k=1}^{N_0} n_k \gamma_{ik} + r \right),$$

where $1 < i < N$.

* * * * *